E. SCHAUB.
APPARATUS FOR DISSOLVING AND TREATING VEGETABLE TANNING EXTRACTS.
APPLICATION FILED MAR. 2, 1914. RENEWED FEB. 26, 1915.

1,158,304.  Patented Oct. 26, 1915.

WITNESSES:  INVENTOR.
Paul F. Roeger  Emil Schaub
  BY
  ATTORNEY.

UNITED STATES PATENT OFFICE.

EMIL SCHAUB, OF WEEHAWKEN, NEW JERSEY, ASSIGNOR TO PAUL VOIGES, OF NEW YORK, N. Y.

APPARATUS FOR DISSOLVING AND TREATING VEGETABLE TANNING EXTRACTS.

1,158,304.  Specification of Letters Patent.  Patented Oct. 26, 1915.

Application filed March 2, 1914, Serial No. 822,106. Renewed February 26, 1915. Serial No. 10,818.

*To all whom it may concern:*

Be it known that I, EMIL SCHAUB, a citizen of the Republic of Switzerland, residing at Weehawken, State of New Jersey, have invented certain new and useful Improvements in Apparatus for Dissolving and Treating Vegetable Tanning Extracts, of which the following is a specification.

Numerous apparatus for dissolving tanning extracts have been invented heretofore in which for instance steam was used for heating the dissolving agent to a high temperature. However the use of steam is objectionable as it is the cause for the oxidation of the extracts which considerably lowers the value of the same. If steam is replaced by one of the well-known chemical dissolving agents or solvents in the form of vapor, the oxidation and consequently the depreciation are correspondingly increased. Another disadvantage connected with the use of steam is to be seen in the fact that in consequence of its condensation it is extremely difficult to obtain a final product of a predetermined desired strength. In another apparatus steam has only been indirectly used, however all these known apparatus show the disadvantage that the agitation of the solvent is too slow for carrying out the process of dissolving within a comparatively short time and at the same time producing a final, uniform solution. The injurious oxidation is increasing at the same ratio in which the time for carrying out the process is increased. Furthermore all known apparatus of this kind show the important disadvantage that the force used for the agitation of the solution is not proportional to the result obtained, for instance in apparatus where the extract is moved to and fro within the solution in a copper screen vessel.

In the accompanying drawing a preferred form of my apparatus is illustrated by way of example.

Figure 1:
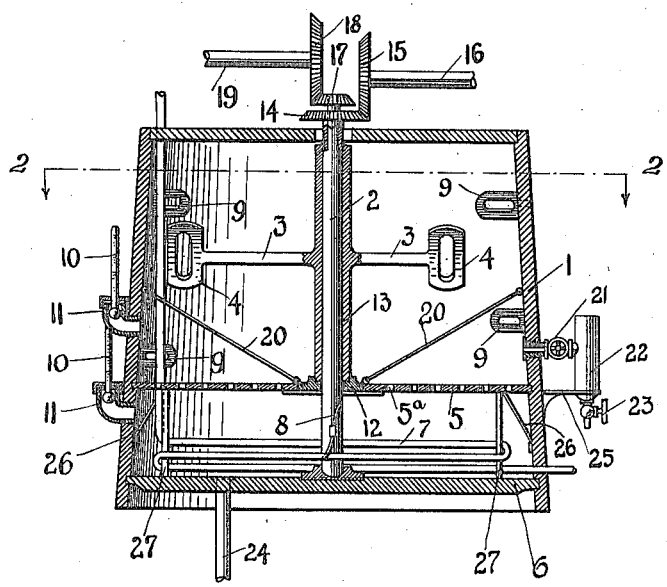
Figure 2:
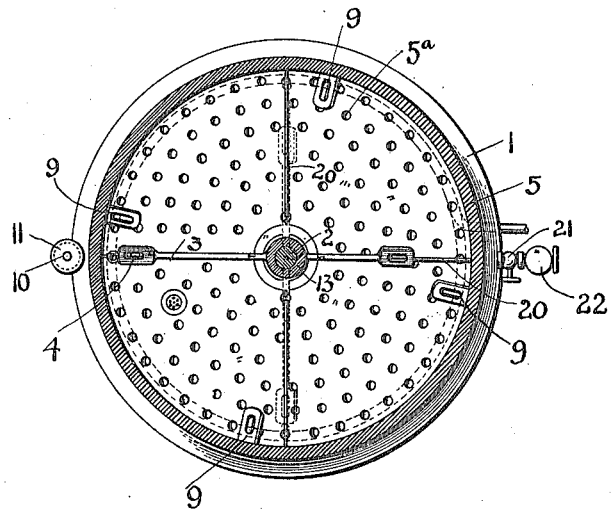

Figure 1 is a vertical longitudinal sectional through the apparatus. Fig. 2 is a horizontal section on line 2—2 of Fig. 1.

The apparatus consists of a cylindrical or conical vessel 1 the vertical longitudinal axle of which constitutes a bearing for a sleeve 13 of an agitator 2 having arms 3 with perforated agitating ladles or wings 4. At about one-third of its height a perforated circular disk or plate 5 is arranged within the vessel adapted to carry the extracts to be dissolved. At a suitable distance above the bottom 6 of the vessel 1 a closed spiral heating serpentine pipe 7 is provided for heating the solution. This pipe 7 is preferably arranged at a certain distance above the bottom 6 in order to increase considerably the heating surface and to prevent incrustation of the pipe walls by the impurities settling upon the bottom.

Below the perforations 5ª of the plate 5 an agitator 8 is suitably secured near the lower end of the axle 2, the arms of which are rotating in a direction opposite to the direction of rotation of the arms 3 above the extract. The side walls of the vessel 1 carry conveniently arranged perforated ladles or wings 9, 9 assisting in the agitation of the solution. Thermometers 10, 10 suitably arranged above each other within pipe stems 11, 11 extending through the side walls of the receptacle are readable on the outside of the same and indicate the temperature prevailing above and below the disk or plate 5. The plate 5 by means of a cylindrical bushing 12 loosely surrounds the lower end of the rotatable sleeve 13 rotating around the shaft 2 and carrying at its upper end a beveled gear 14 adapted to be rotated from a bevel gear at the end of a driving shaft 16. A bevel gear 17 upon the outer extreme end of the shaft 2 receives its rotation from a bevel gear 18 upon a driving shaft 19.

A pair of braces 20 brace the plate 5 within the receptacle. Upon one side the casing or vessel 1 is provided above the plate 5 with a valve controlled outlet 21 leading to a sampler 22 from which the solution may be drawn through a valve 23.

The residue is removed through a pipe 24 at the bottom of the receptacle or vessel 1.

The sampler rests upon a bracket 25 secured to the side wall of the vessel 1 and brackets 26 and standards 27 serve to support the plate 5 and hold the same in its adjusted position within the vessel 1.

The device operates in the following manner: The comminuted extract is placed upon the perforated plate or sieve 5 and the vessel is supplied with part of the solvent whereafter heat is supplied to the serpentine tube. As soon as the temperature has reached a predetermined degree indicated by the thermometers, the remainder of the solvent agent is supplied and the agitators are operated. The softened and dissolved extract settles in fine streams through the perforations of the plate 5. Extract and solvent are intimately mixed by the operation of the agitators and the extract is positively dissolved by the action of the solvent upon its surface.

It is to be understood that changes may be made in the general construction of my apparatus and in the shape or form and material of its single parts without deviating from the spirit or scope of my invention.

My apparatus presents a large operating plane for the solution to act upon the extract to be treated. The stirring or agitating means allow of an economical use of the developed forces for the quick production of a uniform product. The large size of the plane supporting the extract to be treated by the solvent and the intense mixture of extract and solvent allow the carrying out of the process at comparatively low temperatures. This aside from the economic features is an important feature, because high temperatures prevailing during the treatment of tanning extract especially of the modern solid quebracho-extracts cause important and injurious changes in the quality of the product.

I claim:

1. Apparatus for treating extracts for tanning purposes of the character described comprising a casing, a vertical, rotary, central axle within said casing rotating in one direction, a sleeve surrounding said axle and rotating in the opposite direction, means supported in said casing and surrounding the lower end of said sleeve and adapted to support the extracts to be treated, agitators above said extract supporting means secured to said sleeve, agitators below said extract supporting means secured to said axle, means for heating the contents of said casing, means for assisting in the agitation, means for rotating said axle and said sleeve in opposite directions, and means for sampling said solution.

2. Apparatus for treating extracts for tanning purposes of the character described comprising a cylindrical casing, a vertical, rotary, central axle within said casing rotating in one direction, a sleeve surrounding said axle and rotating in the opposite direction, a perforated plate supported in said casing and loosely surrounding with a cylindrical bushing the lower end of said sleeve and adapted to support the extracts to be treated, agitators secured to said sleeve above said plate comprising agitating arms with perforated agitating wings at their outer ends, agitators secured to said axle below said plate, means for heating the contents of said casing, perforated wings at the inner walls of said casing for assisting the agitation, bevel gears upon the outer ends of said sleeve and said axle operating for rotating the same in opposite directions, and means for sampling the solution.

3. Apparatus for treating extracts for tanning purposes of the character described comprising a conical casing, a vertical, rotary, central axle within said casing, rotating in one direction, a sleeve surrounding said axle and rotating in the opposite direction, a perforated plate supported in said casing by standards and brackets and loosely surrounding with a cylindrical bushing below the lower end of said sleeve and adapted to support the extracts to be treated, agitators secured to said sleeve above said plate, consisting of agitating arms carrying perforated agitating wings at their extreme outer ends, agitators secured to said axle below said plate, a heating serpentine coil for heating the contents of said casing and supported above the bottom of the same, perforated wings at the inner walls of said casing for assisting the agitation, bevel gears upon the upper ends of said sleeve and said axle adapted to be operated by bevel gears upon driving shafts for rotating the sleeve and the axle in opposite directions, thermometers at the outside of the casing in pipe stems extending through the wall of said casing above and below said plate, a valve controlled sampler on one side of said casing for permitting a sampling of the solution, and means for removing the residue.

In testimony whereof I affix my signature in presence of two witnesses.

EMIL SCHAUB.

Witnesses:
 ALEXANDER DENES,
 ALEXANDER HAMBURGER.